United States Patent
Ehrich et al.

(10) Patent No.: US 9,227,152 B2
(45) Date of Patent: Jan. 5, 2016

(54) MODIFIED GAS FEED ELEMENT FOR USE IN GASIFICATION PLANTS HAVING DRY FUEL INTRODUCTION

(71) Applicants: Ronny Ehrich, Freiberg (DE); Lutz Güldenpfennig, Bad Düben (DE); Stefanie Henker, Weißenborn (DE); Frank Kirsch, Freiberg (DE); Thomas Metz, Freiberg (DE)

(72) Inventors: Ronny Ehrich, Freiberg (DE); Lutz Güldenpfennig, Bad Düben (DE); Stefanie Henker, Weißenborn (DE); Frank Kirsch, Freiberg (DE); Thomas Metz, Freiberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/022,270

(22) Filed: Sep. 10, 2013

(65) Prior Publication Data

US 2014/0069070 A1    Mar. 13, 2014

(30) Foreign Application Priority Data

Sep. 11, 2012  (DE) .......... 10 2012 216 083

(51) Int. Cl.
*B01D 46/00* (2006.01)
*C10J 3/50* (2006.01)
*B01D 46/10* (2006.01)

(52) U.S. Cl.
CPC ............. *B01D 46/0002* (2013.01); *C10J 3/506* (2013.01); *B01D 46/10* (2013.01); *B01D 2265/06* (2013.01)

(58) Field of Classification Search
CPC ........ B01D 46/02; B01D 46/04; B01D 46/06; B01D 46/10; B01D 46/75; B01D 46/2411
USPC .................. 55/473, 495, 498, 524, 528
See application file for complete search history.

(56) References Cited

U.S. PATENT DOCUMENTS

| 4,338,878 A | * | 7/1982 | Mason et al. ................. 118/429 |
| 5,505,892 A | * | 4/1996 | Domme ..................... 264/29.6 |
| 5,651,810 A | * | 7/1997 | Flaherty et al. ................. 95/287 |
| 5,702,494 A | * | 12/1997 | Tompkins et al. .............. 55/498 |
| 5,912,370 A | * | 6/1999 | McConkey ................. 55/385.3 |
| 2014/0069070 A1 | * | 3/2014 | Ehrich et al. .................... 55/495 |

FOREIGN PATENT DOCUMENTS

| CN | 2061863 U | 9/1990 |
| CN | 102154029 A | 8/2011 |

\* cited by examiner

*Primary Examiner* — Jason M Greene
*Assistant Examiner* — Karla Hawkins

(57) ABSTRACT

A gas feed element for feeding gas into a dust-like loose material having a high permissible differential pressure in respect of the thickness of the gas feed element and a high operating temperature range is provided. The gas feed element has a support plate having openings and is arranged on the side of the filter material facing the gas flow and on the side of the filter material facing away from the gas flow. The gas feed element permits rapid pressurization of a pressure vessel containing a stock of coal dust. Particular configurations of the filter material are provided by metallic filtration mesh with or without support mesh, sintered metal and sintered polymer, in each case having a filter fineness of from 5 µm to 1000 µm.

11 Claims, 1 Drawing Sheet

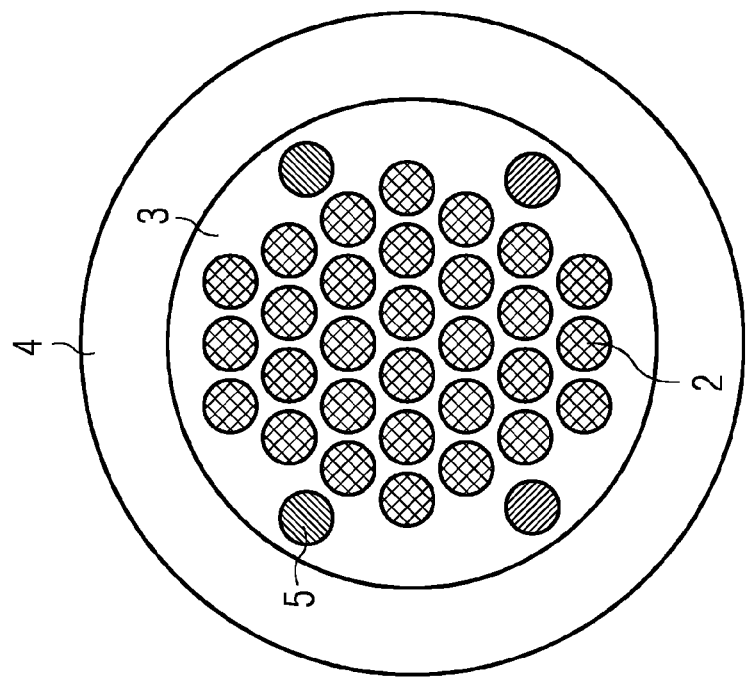
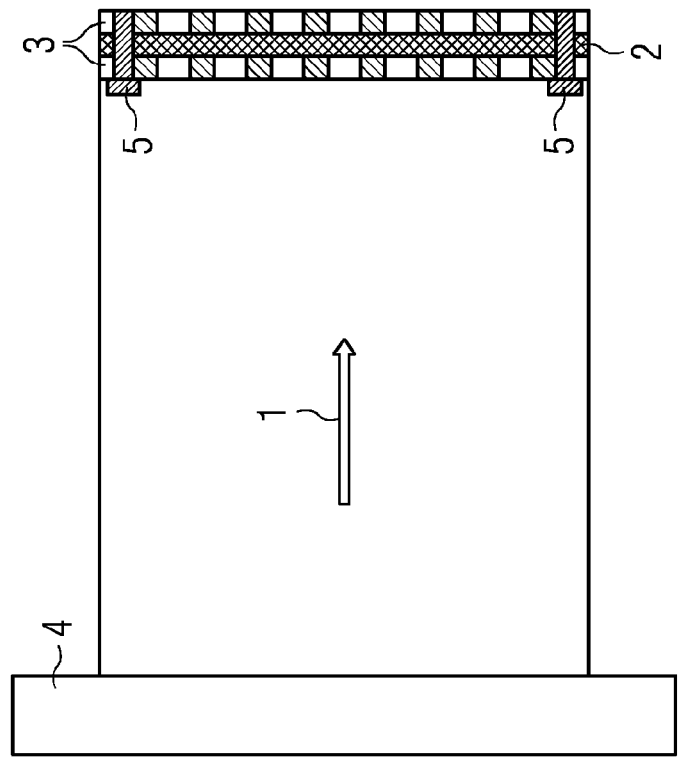

MODIFIED GAS FEED ELEMENT FOR USE IN GASIFICATION PLANTS HAVING DRY FUEL INTRODUCTION

CROSS REFERENCE TO RELATED APPLICATIONS

This application claims priority to German application No. 10 2012 216 083.3 DE filed Sep. 11, 2012, the entire content of which is hereby incorporated herein by reference.

FIELD OF INVENTION

The invention relates to a gas feed element for feeding gas into a dust-like loose material having a high permissible differential pressure in respect of the thickness of the gas feed element and a high operating temperature range.

BACKGROUND OF INVENTION

In entrained-flow gasification, the starting material to be gasified (e.g. coal dust) is kept available in the feed system, pressurized to the required operating pressure of, for example, 4 MPa and fed via feed lines to the burner. Here, the rapid pressurization of the fuel dust to the operating pressure in the transfer vessel presents a particular problem. Pressurization is effected by addition of $N_2$ or $CO_2$ as pressurizing medium. This pressurization process can lead to consolidation of the fuel dust bed when the pressurizing medium is introduced exclusively from the top into the transfer vessel. In order to ensure trouble-free running-out of the fuel dust, this consolidation must be avoided at all costs.

To avoid consolidation of the fuel dust bed in the transfer vessel as a result of the pressurization process, a substream of the gas required for pressurization has to be introduced via the lower, conical region of the vessel. Discharge aids as are routinely used in the form of, for example, ventilation cushions or vibration pads in silo technology are unsuitable. These elements are designed for the atmospheric-pressure range and are not subjected to any relatively great pressure stress or temperature-change stresses. Use has hitherto been made of elements which have to fulfill two tasks. Due to the requirement of a very short pressurization time of the transfer vessel, relatively large amounts of gas have to be able to be introduced via these elements into the transfer vessel within a few minutes. This requires a high porosity of the filter material to keep the pressure drop as low as possible. Backflow of fuel dust into the gas path has to be avoided. On the other hand, these elements serve as discharge aids during emptying of the transfer vessel, which requires a very large gas introduction area over which the gas flows uniformly distributed into the transfer vessel. Elements having a synthetic resin-bonded pebble filter have hitherto been used. Owing to its porosity, this material presents a very low flow resistance. At the same time, the porosity is chosen so as to be sufficiently low to avoid intrusion of fuel dust particles into the filter or into the gas feed line. Owing to the materials properties of the pebble filter, the maximum differential pressure over this element and the maximum pressurizing gas temperature are limited to appropriate values. This limitation of the differential pressure or of the temperature normally presents no problems in plant operation. When these parameters are exceeded as a result of incorrect operation, e.g. increased pressurizing gas feed or exceeding of the maximum permissible pressurizing gas temperature, damage to the synthetic resin-bonded pebble filter occurs.

Exceeding of the design parameters (differential pressure, temperature) can lead to damage to the pebble filter. A reduction in the filter material thickness leads to a reduction in the maximum permissible differential pressure. However, the maximum permissible differential pressure is likewise an important design criterion for the element.

SUMMARY OF INVENTION

The invention addresses the problem of providing a gas feed element for the introduction of gas into a dust-like loose material, in which the parameters thickness of the gas feed element, high permissible differential pressure and magnitude of the permissible operating temperature achieve a new optimum.

The problem is solved by an element having the features of the independent claim.

The invention proceeds from the recognition that a more robust configuration compared to the conventional pebble filter is necessary to avoid damage to the filter element. As mentioned above, the materials properties of the pebble filter are a limiting factor. For this reason, construction of the element using more heat resistant materials is provided.

The invention involves the construction of an element via which rapid pressurization of a pressure vessel can be realized. Here, the comparatively high permissible differential pressures and pressurizing gas temperatures combined with good distribution of the gas over the area of the element are critical advantages of this design. In addition, a support plate with holes which can be removed on one side simplifies replacement of a defective filter element. However, this possibility of disassembly should be considered merely as an option. Welding-on of the two support plates on both sides is possible. For construction of the element, recourse can largely be made to standard materials, which leads to a reduction in the production costs. The higher operating life of this element to be expected from the structural configuration contributes decisively to increasing the availability of the entire feed system.

Advantageous embodiments of the invention are indicated in the dependent claims.

BRIEF DESCRIPTION OF THE DRAWINGS

The invention is illustrated below as working example with the aid of figures as required to help understanding. The figures show:

FIG. 1 a side view of a gas feed element according to the invention and

FIG. 2 a front view of the gas feed element according to the invention.

DETAILED DESCRIPTION OF INVENTION

In the figures, identical reference numerals denote identical or corresponding elements.

A tube section has a mounting ring (4) at one end and the filter element at the other end. The pressurizing gas 1 flows through the tube section from the end of the mounting ring in the direction of the filter element. The filter element is formed by two support plates 3 between which the filter material is held. The choice of filter material depends on the required fineness of the filter, which represents a prerequisite for a very low flow resistance or protection against backflowing fuel dust. This filter material provided with the appropriate filter fineness has to be designed so as to be insensitive to the maximum possible pressurizing gas temperatures. To keep the hydrodynamic pressure drop low, the lowest possible filter material thickness has to be selected. To achieve a high permissible differential pressure, the filter material is reinforced on both sides by use of the support plates 3. Uniform distribution of the holes in the material over the plates mounted on both sides ensures uniformly distributed gas flow into the pressurized transfer vessel in a manner analogous to the pebble filter design.

The following configurations of the filter material are possible for the envisaged use conditions of the element:
- metallic filtration mesh with or without support mesh [filter fineness: from 5 μm to 1000 μm]
- sintered metal [filter fineness: from 5 μm to 1000 μm]
- sintered polymer [filter fineness: from 5 μm to 1000 μm]

The plates which support the filter material on the two sides, in the preceding description referred to as support plates, should have appropriate structural features:

Area ratio of holes/plate material: from 0.15 to 0.70 [a smaller or larger area ratio would lead to structural problems with the elements because of the requirement of a minimum loosening area and a maximal nominal support width while at the same time ensuring the required strength.]

Shape of the Holes Present in the Plates:

The holes to be introduced into the plates should be distributed symmetrically over the area of the elements. Here, the shape of the holes can be variable. The critical aspect is to adhere to the area ratio indicated. Thus, for example, circular holes or slits are possible.

LIST OF REFERENCE NUMERALS

1 pressurizing gas
2 filter material
3 support plate with openings, holes
4 mounting ring
5 releasable connection, screwClaims

The invention claimed is:

1. A gas feed element for feeding gas into a dust-like loose material having a high permissible differential pressure with respect to a thickness of the gas feed element and a high operating temperature range, comprising:
   a tube for conveying the pressurized gas;
   a filter element disposed at a downstream end of the tube and oriented transverse to a direction of flow of the pressurized gas through the filter element, the filter element comprising:
      a filter material through which the pressurized gas flows, the filter material having a planar body; and
      a first support plate and a second support plate, each comprising openings and a planar body, the support plates supporting the filter material therebetween, wherein the filter element is arranged such that the pressurized gas flows through the first support plate, through the filter material, and then through the second support plate,
   wherein the filter material is formed from at least one of a sintered metal or a sintered polymer.

2. The gas feed element as claimed in claim 1, wherein the filter material is formed by a metallic filtration mesh.

3. The gas feed element as claimed in claim 2, wherein the metallic filtration mesh comprises a support mesh.

4. The gas feed element as claimed in claim 1, wherein the filter material comprises a filter fineness of from 5 μm to 1000 μm.

5. The gas feed element as claimed in claim 1, wherein an area ratio of the openings to material of the support plates is from 0.15 to 0.70.

6. The gas feed element as claimed in claim 1, further comprising cylindrical openings through the support plates and the filter material for installation of releasable connections.

7. The gas feed element as claimed in claim 1, wherein the openings of the first support plate or the second support plate are equally distributed over a plane of the respective support plate.

8. The gas feed element as claimed in claim 1, wherein the openings comprise a circular shape.

9. The gas feed element as claimed in claim 1, wherein the openings comprise a slit-like shape.

10. The gas feed element as claimed in claim 1, wherein the gas feed element comprise a round cross section when viewed from front.

11. A gas feed element for feeding gas into a dust-like loose material having a high permissible differential pressure with respect to a thickness of the gas feed element and a high operating temperature range, comprising:
   a tube for conveying the pressurized gas;
   a filter material through which the pressurized gas flows, the filter material having a planar body; and
   a first support plate and a second support plate, each comprising openings and a planar body, the support plates supporting the filter material therebetween;
   wherein an area ratio of the openings to material of the support plates is from 0.15 to 0.70.

* * * * *